(No Model.)

E. ZOLLER.
PICTURE FRAME.

No. 563,002. Patented June 30, 1896.

Witnesses,
F. W. Woerner
L. A. Minturn

Inventor,
Edmund Zöller,
By Joseph A. Minturn
HIS ATTORNEY.

UNITED STATES PATENT OFFICE.

EDMUND ZÖLLER, OF INDIANAPOLIS, INDIANA.

PICTURE-FRAME.

SPECIFICATION forming part of Letters Patent No. 563,002, dated June 30, 1896.

Application filed April 3, 1896. Serial No. 586,068. (No model.)

*To all whom it may concern:*

Be it known that I, EDMUND ZÖLLER, a citizen of the United States, residing at Indianapolis, in the county of Marion and State of Indiana, have invented certain new and useful Improvements in Picture-Frames; and I do hereby declare the following to be a full, clear, and exact description of the invention, such as will enable others skilled in the art to which it appertains to make and use the same.

The object of this invention is to provide means for framing photographs and other pictures behind a covering of glass whereby the glass will give stiffness, shape, and body to the structure and will in fact be the frame itself. The object also is to provide means for ornamenting the glass and give to it the appearance of greater strength and durability than it would possess in its naked state, and to provide a novel, attractive, simple, and inexpensive mounting for pictures.

I accomplish the objects of the invention by the mechanism illustrated in the accompanying drawings, in which—

Figure 1:
Figure 2:
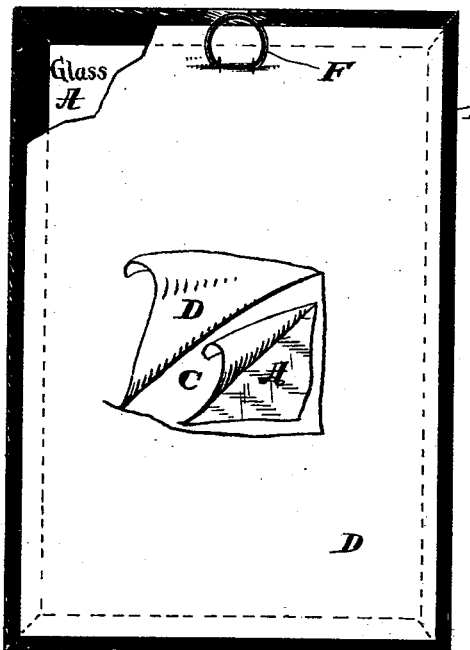
Figure 3:
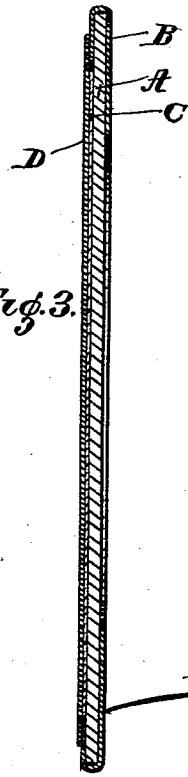
Figure 4:
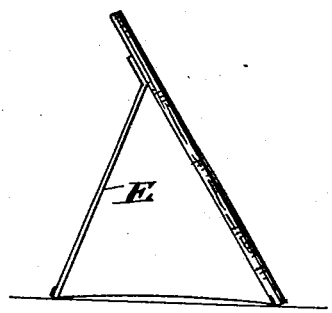

Figure 1 is a front view of a frame finished in accordance with this invention. A corner of the covering of the glass is removed in order to show the glass underneath. Fig. 2 is a view of the reverse or back side of the frame and shows the backing torn away from one corner and also torn and turned back to show the paper on which the picture is printed, said picture being also torn and turned back to show the underlying glass. Fig. 3 is a view in cross-section on the line 3 3 of Fig. 1. Fig. 4 is a view in side elevation of the frame, showing the brace for supporting the frame in an inclined position.

Similar letters of reference indicate like parts throughout the several views of the drawings.

A represents a pane of glass of any desired size and shape, here shown as a size suitable for cabinet-photographs and as having four parallel sides, though in shape it might be round, oval, octagonal, or any other desired shape, instead of that shown in the drawings, without departing from the spirit of my invention.

The special feature of importance in this invention consists of the use of the rigid pane of glass to give form and strength and stiffness to the frame, and in fact forms and is the frame, and also provides a transparency through which the picture can be seen.

B is a mat or covering of leatherette, plush, silk, or other suitable material which covers one side of the glass plate, which covered side I will designate as the "front," and the mat has its edges bound around the edges of the glass and glued fast to the back of the glass. A portion of the mat will be removed, in oval, square, diamond, star, or any desired shape, from near the central portion of the mat, so as to leave the glass unobstructed opposite those parts.

C is an unmounted print, such as photographers produce and usually mount by pasting onto cardboard. These prints C will be pasted or glued to the back side of the glass so as to show the picture through the opening in the mat. This mat protects the edges of the pane of glass and strengthens the structure and also gives a substantial and finished appearance to same.

D is a backing of heavy paper or other suitable material which is pasted or glued onto the back of the glass so as to cover the picture and extend over onto the adjacent edges of the mat on the back of the glass.

In practice the glass plates, with their mats attached, will be supplied to consumers, such as photographers and picture-dealers, with the backing D removed, ready to have such pictures as they may desire mounted on the glass, and can be supplied at the same or nearly the same cost as the cards usually used by photographers for mounting their prints.

When the frames are designed to stand on the mantel or table, they will be provided with the back-braces E, and if meant to be hung against the wall they will be provided with the rings F, both of which, brace and ring, will be fastened to the backing D.

Having thus fully described my invention, what I claim as new, and wish to secure by Letters Patent of the United States, is—

1. The combination, with a photographic or other print, of a pane of glass to which the print is fastened so as to show the printed matter through the said glass, said pane forming the shape, strength and body of the structure and being the frame itself, a mat of ornamental material of greater area than the area of the pane of glass, fastened to the glass on the side opposite to the print and having its edges bound around the edges of the glass and fastened to the back of the glass, said mat having a cut-away portion whereby the picture on the opposite side of the glass can be seen through the glass, and a backing of heavy paper or other suitable material fastened to the back of the glass and covering the print and overlapping the edges of the mat on the back of the glass, in the manner substantially as described and for the purposes specified.

2. A sealed frame for mounting pictures, consisting of a pane of glass of the required shape and size and forming the body of the frame, a mat of any suitable ornamental material such as plush or leatherette, extending over one of the sides of the glass and lapping around the edges of said glass and having the edges of the mat secured to the back side of the glass, the said mat having a cut-away portion through which the glass can be seen and through which any picture placed on the opposite side of the glass can be seen, and a backing of heavy paper or other suitable material secured to the back of the glass and impinging the picture between itself and the glass and overlapping the edges of the mat on the back of the glass and pasted or glued thereto, substantially in the manner as described and for the purposes specified.

In testimony whereof I affix my signature in presence of two witnesses.

EDMUND ZÖLLER.

Witnesses:
 JOSEPH A. MINTURN,
 ALICE WALSH.